United States Patent
Konig et al.

(10) Patent No.: US 10,306,299 B2
(45) Date of Patent: May 28, 2019

(54) METHODS, SYSTEMS, AND MEDIA FOR TRANSFERRING PLAYBACK OF MEDIA CONTENT

(71) Applicant: Google LLC, Mountain View, CA (US)

(72) Inventors: Stephen Konig, Newcastle, WA (US); Yuri James Wiitala, Kirkland, WA (US); Xiangjun Zhang, Sammamish, WA (US); Chien-Jung Kung, San Jose, CA (US)

(73) Assignee: Google LLC, Mountain View, CA (US)

( * ) Notice: Subject to any disclaimer, the term of this patent is extended or adjusted under 35 U.S.C. 154(b) by 121 days.

(21) Appl. No.: 15/604,218

(22) Filed: May 24, 2017

(65) Prior Publication Data

US 2018/0343492 A1 Nov. 29, 2018

(51) Int. Cl.

| G06F 3/14 | (2006.01) |
|---|---|
| H04N 21/435 | (2011.01) |
| H04L 29/06 | (2006.01) |
| H04N 21/41 | (2011.01) |

(Continued)

(52) U.S. Cl.
CPC ....... *H04N 21/4355* (2013.01); *G06F 3/0483* (2013.01); *G06F 3/1454* (2013.01); *H04L 65/1069* (2013.01); *H04L 65/4015* (2013.01); *H04L 65/602* (2013.01);
(Continued)

(58) Field of Classification Search
CPC ........... H04N 21/4355; H04N 21/4113; H04N 21/43615; H04N 21/4122; H04N 21/42224; H04N 21/4126; H04N 21/2223; H04L 65/602; H04L 65/4015; H04L 65/1069; H04L 65/4076; G06F 3/1454; G06F 3/0483; G06F 3/04817; G06F 17/2247; H04M 1/72533; G06K 9/00758
See application file for complete search history.

(56) References Cited

U.S. PATENT DOCUMENTS

| 9,088,748 B2 | 7/2015 | Hilbrink et al. |
|---|---|---|
| 9,257,097 B2 | 2/2016 | Subramaniam et al. |
| 2010/0011135 A1 | 1/2010 | Jawa et al. |

(Continued)

*Primary Examiner* — Le H Luu
(74) *Attorney, Agent, or Firm* — Byrne Poh LLP

(57) ABSTRACT

Methods, systems, and media for transferring playback of media content are provided. In some implementations, the method comprises: receiving a request to initiate a mirroring session in which a tabbed window including a page having a plurality of media content items is rendered on a computing device and transmitted as a video stream to a display device that is in communication with the computing device over a local area network; encoding the video stream including the tabbed window and the plurality of media content items; transmitting the encoded video stream to the display device via the local area network; determining that a user of the tabbed window on the display device intends to view a media content item from the plurality of media content items on the page; inhibiting presentation of the media content item on the computing device; causing the media content item to be decoded and presented on the display device; detecting an event associated with presentation of the media content item on the display device; and, in response to detecting the event associated with presentation of the media content item on the display device, causing the mirroring session to resume.

21 Claims, 6 Drawing Sheets

(51) Int. Cl.
    *G06F 3/0483*     (2013.01)
    *H04N 21/436*     (2011.01)

(52) U.S. Cl.
    CPC ..... *H04N 21/4113* (2013.01); *H04N 21/4122* (2013.01); *H04N 21/43615* (2013.01)

(56) References Cited

U.S. PATENT DOCUMENTS

| | | | |
|---|---|---|---|
| 2010/0138744 A1 | 6/2010 | Kamay et al. | |
| 2011/0283306 A1* | 11/2011 | Davis | H04M 1/72533 725/9 |
| 2012/0291060 A1* | 11/2012 | Relyea | H04N 21/4126 725/25 |
| 2014/0006949 A1* | 1/2014 | Briand | G06F 3/04817 715/716 |
| 2014/0032634 A1* | 1/2014 | Pimmel | H04L 65/4076 709/203 |
| 2016/0048485 A1* | 2/2016 | Sherwood | G06F 17/2247 715/234 |
| 2016/0050326 A1* | 2/2016 | Lee | H04N 21/2223 358/402 |
| 2016/0182930 A1* | 6/2016 | Ortiz | G06K 9/00758 725/25 |
| 2016/0321222 A1* | 11/2016 | Greenberg | G06F 17/2247 |
| 2017/0038937 A1* | 2/2017 | Agnihotri | H04N 21/42224 |
| 2018/0053003 A1* | 2/2018 | Nair | G06F 3/1454 |
| 2018/0293043 A1* | 10/2018 | Watson | G06F 3/1454 |
| 2018/0343492 A1* | 11/2018 | Konig | H04N 21/4355 |

\* cited by examiner

400

Computing Device 208

- 402 — BEGIN PRESENTING A PAGE OF CONTENT (E.G., A WEB PAGE WITH EMBEDDED VIDEO)
- 404 — RECEIVE AN INPUT TO BEGIN MIRRORING THE PAGE ON THE DISPLAY DEVICE (E.G., INITIATE A MIRRORING SESSION)
- 406 — TRANSMIT A VIDEO STREAM THAT INCLUDES THE PAGE
- 410 — RECEIVE AN INDICATION THAT A MEDIA CONTENT ITEM IN THE PAGE IS TO BE PRESENTED (E.G., AT THE EXCLUSION OF OTHER CONTENT ON THE PAGE)
- 412 — TRANSMIT THE ENCODED MEDIA CONTENT ITEM (E.G., INITIATE A MEDIA REMOTING SESSION)
- 416 — RECEIVE AN INDICATION THAT PRESENTATION OF THE MEDIA CONTENT ITEM HAS FINISHED
- 418 — RESUME MIRRORING THE PAGE ON THE DISPLAY DEVICE (E.G., VIA THE MIRRORING SESSION)

Display Device 210

- 408 — BEGIN PRESENTING THE PAGE
- 414 — DECODE THE MEDIA CONTENT ITEM AND PRESENT THE DECODED MEDIA CONTENT ITEM
- 420 — CONTINUE PRESENTING THE PAGE

FIG. 4

METHODS, SYSTEMS, AND MEDIA FOR TRANSFERRING PLAYBACK OF MEDIA CONTENT

TECHNICAL FIELD

The disclosed subject matter relates to methods, systems, and media for transferring playback of media content.

BACKGROUND

Users frequently want to mirror content they are viewing on a user device, such as a laptop computer or a tablet computer, so that the content is also presented on a display device, such as a television. For example, a user may view a web page with an embedded video on their laptop computer, and may want to view the video on an associated television. However, it can be time-intensive and network-intensive for the laptop computer to transmit the web page and the embedded video to the television for presentation.

Accordingly, it is desirable to provide methods, systems, and media for transferring playback of media content.

SUMMARY

Methods, systems, and media for transferring playback of media content are provided.

In accordance with some implementations of the disclosed subject matter, a computer-implemented method for transferring playback of media content is provided, the method comprising: receiving a request to initiate a mirroring session in which a tabbed window including a page having a plurality of media content items is rendered on a computing device and transmitted as a video stream to a display device that is in communication with the computing device over a local area network; encoding the video stream including the tabbed window and the plurality of media content items; transmitting the encoded video stream to the display device via the local area network; determining that a user of the tabbed window on the display device intends to view a media content item from the plurality of media content items on the page; inhibiting presentation of the media content item on the computing device; causing the media content item to be decoded and presented on the display device; detecting an event associated with presentation of the media content item on the display device; and, in response to detecting the event associated with presentation of the media content item on the display device, causing the mirroring session to resume.

In some implementations, the media content item is received from a server.

In some implementations, the method further comprises: determining whether the display device is capable of decoding the media content item; and, in response to determining that the display device is not capable of decoding the media content item, causing the mirroring session to resume.

In some implementations, the method further comprises: determining whether a signal that the user has maximized a video player window in which the media content item is to be presented has been received; and, in response to determining that the signal has been received, causing a media remoting session to be initiated as the user of the tabbed window intends to view the media content item.

In some implementations, the method further comprises: determining whether a signal that a video player window in which the media content item is to be presented occupies a given portion of the tabbed window; and, in response to determining that the signal has been received, causing a media remoting session to be initiated as the user of the tabbed window intends to view the media content item.

In some implementations, the method detects that the event associated with presentation of the media content item has occurred in response to determining that the user has navigated to a different tabbed window.

In some implementations, the method further comprises causing the media content item to be decrypted by the display device prior to presentation of the media content item on the display device.

In accordance with some implementations of the disclosed subject matter, a system for transferring playback of media content is provided, the system comprising a memory and a hardware processor that, when executing computer executable instructions stored in the memory, is configured to: receive a request to initiate a mirroring session in which a tabbed window including a page having a plurality of media content items is rendered on a computing device and transmitted as a video stream to a display device that is in communication with the computing device over a local area network; encode the video stream including the tabbed window and the plurality of media content items; transmit the encoded video stream to the display device via the local area network; determine that a user of the tabbed window on the display device intends to view a media content item from the plurality of media content items on the page; inhibit presentation of the media content item on the computing device; cause the media content item to be decoded and presented on the display device; detect an event associated with presentation of the media content item on the display device; and, in response to detecting the event associated with presentation of the media content item on the display device, cause the mirroring session to resume.

In accordance with some implementations of the disclosed subject matter, a non-transitory computer-readable medium containing computer-executable instructions that, when executed by a processor, cause the processor to perform a method for transferring playback of media content is provided, the method comprising: receiving a request to initiate a mirroring session in which a tabbed window including a page having a plurality of media content items is rendered on a computing device and transmitted as a video stream to a display device that is in communication with the computing device over a local area network; encoding the video stream including the tabbed window and the plurality of media content items; transmitting the encoded video stream to the display device via the local area network; determining that a user of the tabbed window on the display device intends to view a media content item from the plurality of media content items on the page; inhibiting presentation of the media content item on the computing device; causing the media content item to be decoded and presented on the display device; detecting an event associated with presentation of the media content item on the display device; and, in response to detecting the event associated with presentation of the media content item on the display device, causing the mirroring session to resume.

In accordance with some implementations of the disclosed subject matter, a system for transferring playback of media content is provided, the system comprising: means for receiving a request to initiate a mirroring session in which a tabbed window including a page having a plurality of media content items is rendered on a computing device and transmitted as a video stream to a display device that is in communication with the computing device over a local area network; means for encoding the video stream including the tabbed window and the plurality of media content items; means for transmitting the encoded video stream to the display device via the local area network; means for determining that a user of the tabbed window on the display device intends to view a media content item from the plurality of media content items on the page; means for inhibiting presentation of the media content item on the computing device; means for causing the media content item to be decoded and presented on the display device; means for detecting an event associated with presentation of the media content item on the display device; and means for causing the mirroring session to resume in response to detecting the event associated with presentation of the media content item on the display device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 4 shows an illustrative example of an information flow diagram for transferring playback of media content between a mirroring session and a remoting session in accordance with some implementations of the disclosed subject matter.

DETAILED DESCRIPTION

Figure 1A:
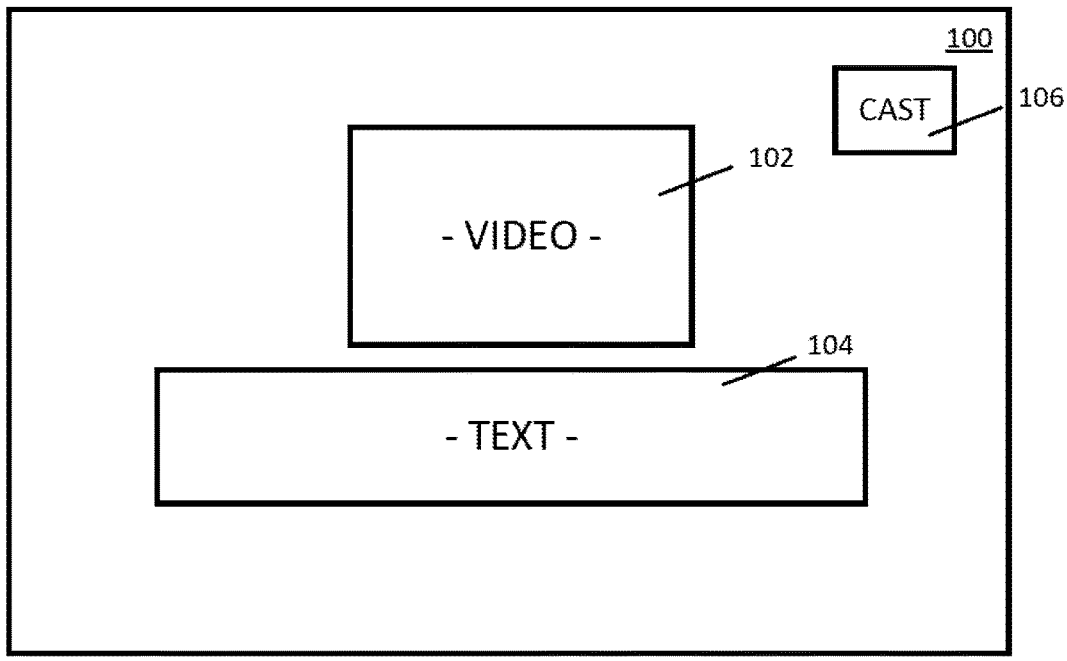
FIGS. 1A, 1B, and 1C show illustrative examples of user interfaces for presenting content on a computing device and causing a media content item to be presented on an associated display device in accordance with some implementations of the disclosed subject matter.

In accordance with various implementations, mechanisms (which can include methods, systems, and media) for transferring playback of media content are provided.

In some implementations, the mechanisms can cause a page of content to be presented on a computing device, such as a tablet computer, a laptop computer, a desktop computer, and/or any other suitable type of computing device. In response to receiving an indication from a user of the computing device to mirror the page of content on an associated display device (e.g., an associated television, projector, speakers, and/or any other suitable type of display device), the mechanisms can initiate a mirroring session by causing the computing device to capture the page of content being presented on the computing device, encode the captured content, and transmit the encoded content to the display device for presentation on the display device, where the display device can decode the encoded content prior to presenting the content on the display device. It should be noted that a mirroring session can include presenting the content on the computing device while simultaneously presenting the content on the associated display device.

In some implementations, the page of content can include one or more media content items, such as video content, audio content, and/or any other suitable media content items. In some implementations, in response to receiving an indication that a user desires to view one of the media content items (e.g., at the exclusion of other content on the page), the mechanisms can cause the mirroring session in which the mirrored page of content is presented to cease, and can cause the selected media content item to be played back on the display device in a remoting session. Examples of received indications that the user desires to view one of the media content items can include, for example, an indication that the user has maximized the video player window such that the media content item is being presented in a full-screen mode, an indication that the video player window occupies a given percentage of the page or the tabbed window, an indication that the size of the video player window is greater than a threshold size, etc.

In some implementations, in response to determining that the indication corresponds to a desire to view one of the media content items presented on the page, the mechanisms can initiate a media remoting session by transmitting a video stream corresponding to the selected media content item directly from the computing device to the display device without first decrypting and/or decoding the media content item at the computing device. For example, this can include bypassing the local decoding, decryption, and rendering on the computing device and transmitting an encoded stream of the media content item (e.g., where the frames of the media content item are highly compressed in comparison with the compressed frames in the re-encoded stream in the mirror session). Additionally, in some implementations, the mechanisms can cause a user interface with video player controls to manipulate playback of the selected media content item (e.g., pause, fast-forward, rewind, mute audio content associated with a video, and/or any other suitable controls) to be presented on the computing device while the selected media content item is being presented on the display device.

In some implementations, the mechanisms can detect an event associated with the presentation of the media content item on the display device. For example, in some implementations, the mechanisms can detect that the media content item has played back to completion, that a user of the computing device has stopped presentation of the media content item on the display device, and/or that a user of the computing device has selected a different media content item for presentation. In some implementations, in response to detecting the event, the mechanisms can resume the mirroring session, where the page of content being presented on the computing device is mirrored on the display device by causing the computing device to capture the page of content being presented on the computing device, encoding the captured content, and transmitting the encoded content to the display device for presentation on the display device.

It should be noted that, although the implementations described herein generally relate to transferring the playback of content from a computing device to a display device, any suitable media playback device that is connected to the computing device can be used for playing back media content. For example, an audio playback device can be connected to the computing device over a local area network and, in response to determining that the content is to be presented on the audio playback device, the computing device can communicate the media content to the audio playback device. In another example, multiple media playback devices, such as multiple display devices and multiple audio devices, can be connected to the computing device over a local area network and, in response to determining that the playback of the content is to be transferred to a media playback device, the computing device can receive a user selection of which media device to present the content (e.g., the media device in which the mirroring session was initiated) or the computing device can determine which media device has the capabilities suitable for presenting the media content.

In some implementations, the mechanisms described herein can allow a user to transfer the playback of a media content item from a computing device to a display device in a manner that reduces power consumption by presenting the media content item on the display device without first presenting, capturing, and re-encoding the media content item on the computing device. Additionally, by transferring the playback of the media content item directly to the display device without re-encoding the media content item on the computing device, the media content item can, in some implementations, be presented on the display device at a relatively higher quality than in the case where the media content item is presented on the computing device and mirrored on the display device.

Turning to FIG. 1A, an example 100 of a user interface for presenting content is shown in accordance with some implementations of the disclosed subject matter. In some implementations, user interface 100 can be presented on a computing device, such as a desktop computer, a laptop computer, a tablet computer, a mobile phone, and/or any other suitable computing device, as shown in and described below in connection with FIGS. 2, 4, and 5.

As shown, in some implementations, content presented on user interface 100 can include any suitable type of content, such as web page content, content from an application executing on the computing device, and/or any other suitable type of content. For example, in some implementations, user interface 100 can include a tabbed window of a web browsing application in which a web page is presented. As another example, in some implementations, user interface 100 can include an application executing on the computing device in which content is being presented. As yet another example, in some implementations, user interface 100 can include a view of a desktop environment of the computing device. In some implementations, the content can include a media content item 102 and other content 104. For example, in some implementations, media content item 102 can be any suitable type of media content, such as a video, a playlist of videos, audio content, a playlist of audio content items, an audiobook, live streamed video, live streamed audio content, a television program, and/or any other suitable type of content. In some implementations, other content 104 can include any other suitable type of content, such as text relating to media content item 102, links to other media content, links to other web page, and/or any other suitable type of content.

Figure 1B:
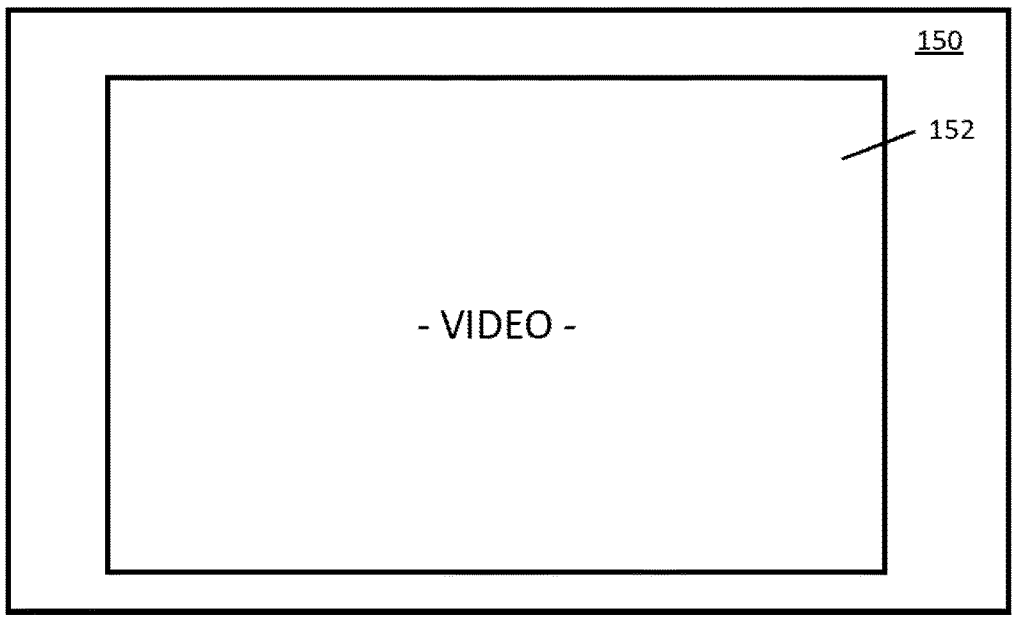

In some implementations, a user of user interface 100 can cause the content of user interface 100 to be mirrored on an associated display device (e.g., a television associated with the computing device, speakers associated with the computing device, and/or any other suitable display device) via a mirroring session. For example, in some implementations, the user can initiate a mirroring session which causes the content to be mirrored on the associated display device by selecting a mirror input 106, as shown in FIG. 1A. In some such implementations, both media content item 102 and other content 104 can be presented on the associated display device. In some implementations, the computing device can then determine that a user of the computing device desires to view the media content item (e.g., in response to determining that the user has maximized a video player window associated with the media content item) and can cause presentation of content on the associated display device to switch to presenting the media content item in a full-screen mode, as shown in FIG. 1B. In some such implementations, media content item 154 can be decoded by the display device and presented on the display device, as shown in and described below in connection with FIGS. 4 and 5.

Figure 1C:
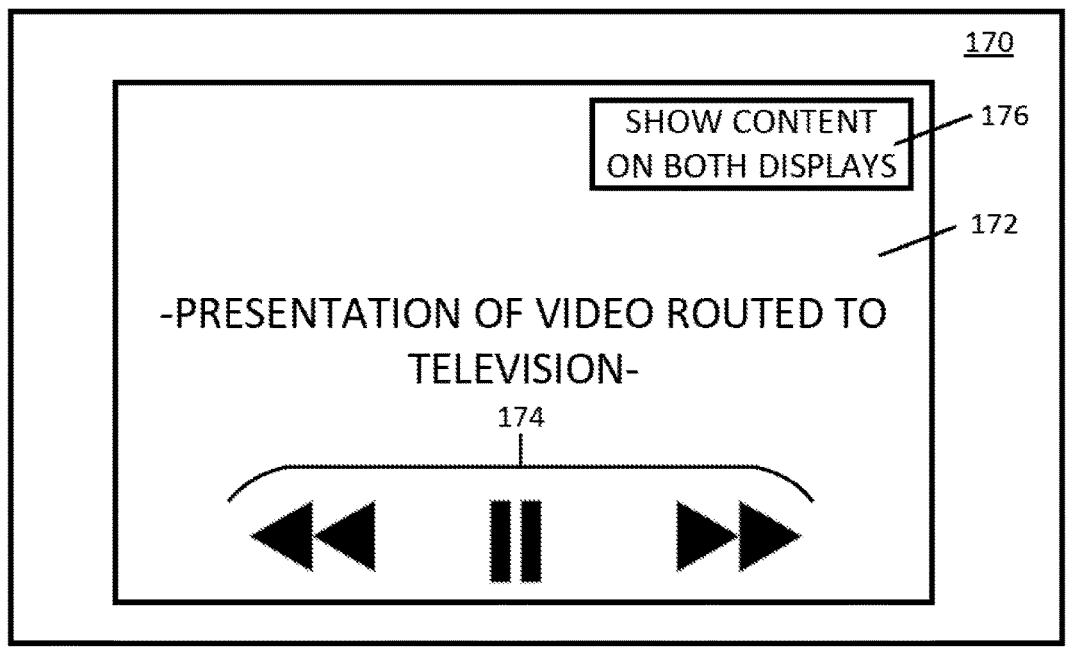

In some implementations, media content item 154 can be presented on the associated display device, and user interface 170 as shown in FIG. 1C can be presented on the computing device concurrently. As illustrated, in some implementations, user interface 170 can inhibit or otherwise suppress the media content item from being presented in user interface 170 and can include text 172 indicating that the media content item is being presented on a particular display device (e.g., with a text overlay that states "playing back on the user's living room television"). Additionally, as shown in FIG. 1C, any suitable controls 174 can be presented in user interface 170 that can allow the user to pause presentation of the media content item on the display device, fast-forward or rewind presentation of the media content item, mute audio content associated with the media content item, change a volume of the audio content, cause closed captioning content to be presented on the display device, and/or manipulate presentation of the media content item in any other suitable manner from the computing device. It should be noted that, in some implementations, controls 174 presented in user interface 170 can be the same controls presented in the user interface that presents the media content item during a mirroring session or in the video player window in a web browsing application. It should also be noted that, in some implementations, user interface 170 can indicate that the associated display device is currently buffering the media content item (e.g., with text that states "buffering," with a particular icon that indicates the media content item is being buffered, and/or in any other suitable manner). In some such implementations, user interface 170 can then be modified to present controls 174 once presentation of the media content item begins on the associated display device.

In some implementations, user interface 170 can include a selectable option 176 that causes the remoting session in which the media content item is being presented on the display device (e.g., at the exclusion of other content on the tabbed window) to cease and the mirroring session to be restored. For example, selectable option 176 can prompt the user to "show content on both displays," which, upon selection, causes the mirroring session to be restored, where the content presented in the tabbed window is presented on both the computing device and the associated display device. In another example, upon automatically switching from a mirroring session to a media remoting session in which the media content item is being presented on the display device, the mechanisms can cause selectable option 176 to appear in the user interface 170 presented on the computing device, which can allow the user to toggle between a previously established mirroring session in which content is being presented on the computing device and the associated display device (e.g., where the computing device can capture the content being presented on the computing device, encode the captured content, and transmit a video stream including the encoded content to the display device for decoding and presentation by the display device) and the currently established remoting session in which a particular media content item is being presented on the display device with controls and/or other options being presented on the computing device.

Figure 2:
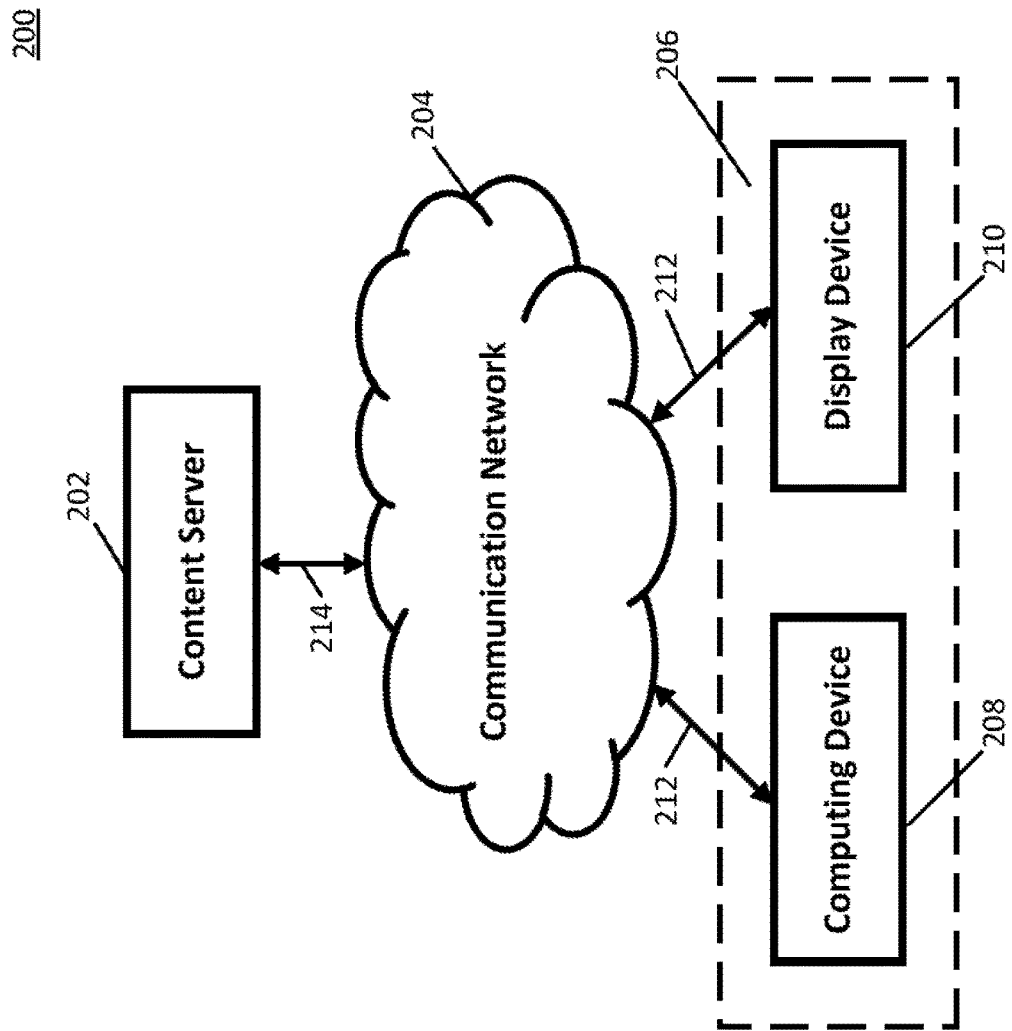
FIG. 2 shows a schematic diagram of an illustrative system suitable for implementation of mechanisms described herein for transferring playback of media content in accordance with some implementations of the disclosed subject matter.

Turning to FIG. 2, an illustrative example 200 of hardware for transferring the playback of media content that can be used in accordance with some implementations of the disclosed subject matter is shown. As illustrated, hardware 200 can include one or more servers such as a content server 202, a communication network 204, and/or one or more user devices 206, such as a computing device 208 and a display device 210.

In some implementations, content server 202 can be any suitable server for storing content and transmitting the content to a user device for presentation. For example, in some implementations, content server 202 can be a server that transmits media content to user device 206 via communication network 204. It should be noted, however, that, in some implementations, media content can be local media content that is stored on a suitable storage device (e.g., a memory) associated with user device 206, such as computing device 208. In continuing this example, local media content can be transmitted from a storage device associated with computing device 208 to display device 210. Additionally or alternatively, local media content may have been downloaded and stored in a suitable storage device from content server 202 or any other suitable device (e.g., in peer-to-peer file sharing). In some implementations, the content on content server 202 can be any suitable content, such as a web page, video content, audio content, movies, television programs, live-streamed content, audiobooks, and/or any other suitable type of content.

Communication network 204 can be any suitable combination of one or more wired and/or wireless networks in some implementations. For example, communication network 204 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 206 can be connected by one or more communications links 212 to communication network 204 that can be linked via one or more communications links (e.g., communications link 214) to content server 202.

Communications links 212 and/or 214 can be any communications links suitable for communicating data among user devices 206 and server 202 such as network links, dial-up links, wireless links, hard-wired links, any other suitable communications links, or any suitable combination of such links.

In some implementations, computing device 208 can be any suitable user device for presenting content, receiving a request from a user of computing device 208 to mirror the content on a display device, transmitting the content to the display device, and/or any other suitable functions. In some implementations, display device 210 can be any suitable device for presenting received content, and/or performing any other suitable functions. In some implementations, user devices 206 can be any suitable type of user devices. For example, in some implementations, user devices 206 can be implemented as a mobile device, such as a smartphone, mobile phone, a tablet computer, a wearable computer, a laptop computer, a vehicle (e.g., a car, a boat, an airplane, or any other suitable vehicle) entertainment system, a portable media player, and/or any other suitable mobile device. As another example, in some implementations, user devices 206 can be implemented as a non-mobile device, such as a desktop computer, a set-top box, a television, a streaming media player, a game console, a speaker, home entertainment device, a media playback device, and/or any other suitable non-mobile device.

In a more particular example, user device 206 can be a display device that includes hardware and/or software for presenting media received from one or more sources of media content. For example, user device 206 can include a television, a smart television, a monitor, a set-top box, an audio video (AV) receiver, any other suitable media playback device and/or any suitable combination thereof. More particularly, user device 206 can include a display, speakers, hardware and/or software for rendering media content such as analog and/or digital video and/or audio data, a power supply, etc. User device 206 can, in some implementations, include various input ports for receiving video and/or audio data from various sources. Such input ports can include one or more HDMI ports, one or more component video ports, one or more composite video ports, one or more USB ports, one or more S-Video ports, one or more TOSLINK ports, one or more coaxial ports, one or more Ethernet ports (whether wired or wireless), etc.

In another more particular example, user device 206 can be any suitable device that can receive an audio signal and output the audio signal (potentially through one or more intermediate devices) to one or more speakers. For example, user device 206 can be an audio video (AV) receiver, a speaker, an amplifier, an audio switch, an HDMI switch, any other suitable audio system and/or any suitable combination thereof. More particularly, user device 206 can include, speakers, hardware and/or software for rendering media content such as analog and/or digital audio and/or video data, a power supply, etc. User device 206 can include various input ports for receiving audio and/or video data from various sources. Such input ports can include one or more HDMI ports, one or more component video ports, one or more composite video ports, one or more USB ports, one or more S-Video ports, one or more TOSLINK ports, one or more coaxial ports, one or more Ethernet ports (whether wired or wireless), etc. Additionally or alternatively, in some implementations, user device 206 can be configured to receive an audio signal over any suitable wireless connection, such as over a connection to a local area network (e.g., via a connection that complies with one of the IEEE 802.11x family of protocols which are sometimes referred to as Wi-Fi connections), or a wireless connection between external sound system 106 and computing device 102, such as an ad hoc wireless network connection, a short-range wireless communication protocol (e.g., Bluetooth, Bluetooth Low Energy, Wireless USB, etc.), etc.

Although content server 202 is illustrated as a single device, the functions performed by content server 202 can be performed using any suitable number of devices in some implementations. For example, in some implementations, multiple devices can be used to implement the functions performed by content server 202.

Although two user devices 208 and 210 are shown in FIG. 2, any suitable number of user devices, and/or any suitable types of user devices, can be used in some implementations.

Figure 3:
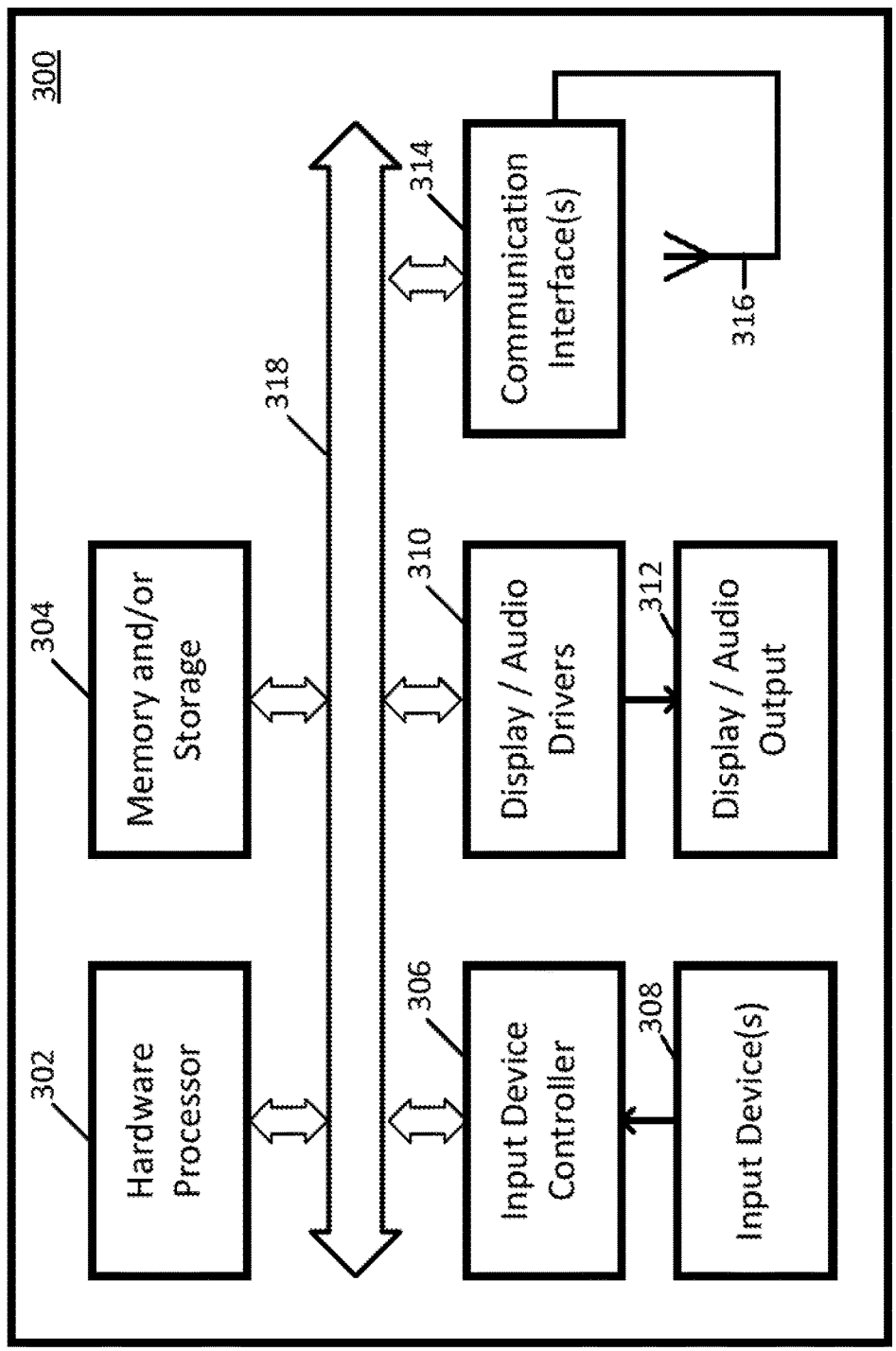
FIG. 3 shows a detailed example of hardware that can be used in a server and/or a user device of FIG. 2 in accordance with some implementations of the disclosed subject matter.

Content server 202 and user devices 206 can be implemented using any suitable hardware in some implementations. For example, in some implementations, devices 202 and 206 can be implemented using any suitable general purpose computer or special purpose computer. For example, a server may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some implementations. In some implementations, hardware processor 302 can be controlled by a server program stored in memory and/or storage 304 of a server (e.g., such as content server 202). For example, the server program can cause hardware processor 302 of content server 202 to transmit requested content to computing device 208, and/or perform any other suitable functions. In some implementations, hardware processor 302 can be controlled by a computer program stored in memory and/or storage 304 of computing device 208. For example, the computer program can cause hardware processor 302 of computing device 208 to receive content, decode and/or decrypt received content, transmit content to a display device in response to receiving a request from a user of computing device 208, and/or perform any other suitable functions. In some implementations, hardware processor 302 can be controlled by a computer program stored in memory and/or storage 304 of display device 210. For example, the computer program can cause hardware process 302 of display device 210 to decode received content and/or present received content, as described below in connection with FIGS. 4 and 5.

Memory and/or storage 304 can be any suitable memory and/or storage for storing programs, data, media content, advertisements, and/or any other suitable information in some implementations. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some implementations. For example, input device controller 306 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 310 can be any suitable circuitry for controlling and driving output to one or more display/audio output devices 312 in some implementations. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks, such as network 204 as shown in FIG. 2. For example, interface(s) 314 can include network interface card circuitry, wireless communication circuitry, and/or any other suitable type of communication network circuitry.

Antenna 316 can be any suitable one or more antennas for wirelessly communicating with a communication network (e.g., communication network 204) in some implementations. In some implementations, antenna 316 can be omitted.

Bus 318 can be any suitable mechanism for communicating between two or more components 302, 304, 306, 310, and 314 in some implementations.

Any other suitable components can be included in hardware 300 in accordance with some implementations.

Turning to FIG. 4, an illustrative example 400 of an information flow diagram for transferring playback of media content is shown in accordance with some implementations of the disclosed subject matter. As illustrated, in some implementations, blocks of information flow diagram 400 can be executed on computing device 208 and/or display device 210.

At 402, computing device 208 can present a page of content. In some implementations, the page of content can be in any suitable format, such as a web page, a tabbed window in which a web page is presented, a browser window, a view of a desktop of computing device 208, a view of an application executing on computing device 208, and/or any other suitable format. In some implementations, computing device 208 can present the page of content in any suitable manner. For example, in some implementations, computing device 208 can receive the content from server 202 that stores the content. In some implementations, the received content can be encoded and/or encrypted in any suitable manner, and computing device 208 can perform any suitable decoding or decryption techniques prior to presentation of the content, as described in more detail in connection with block 506 of FIG. 5.

Note that, in some embodiments, the page of content can be from any suitable source. For example, in some embodiments, the page of content can be received from a server, such as a server that hosts web pages, media content items, and/or any other suitable content. As another example, in some embodiments, the page of content can include content that is stored locally on computing device 208. For example, in some embodiments, the page of content can include a view of an application executing on computing device 208, a view of a desktop of computing device 208, a content item stored locally on computing device 208 (e.g., a locally stored image, video content item, audio content item, and/or any other suitable content item), and/or any other suitable locally stored content. Additionally, in some embodiments, the page of content can include a combination of content that is stored locally and content that is stored on a server. For example, in some embodiments, the page of content can include a view of an application stored locally on computing device 208, where the application includes an option to view media content stored on a server, such as a video content item hosted by the server.

At 404, computing device 208 can receive an indication that the page of content presented on computing device 208 is to be mirrored on display device 210. In some implementations, computing device 208 can receive the indication to initiate a mirroring session in any suitable manner. For example, in some implementations, computing device 208 can receive the indication based on receiving an input from a user of computing device 208 to mirror the content (e.g., using mirror input 106 as shown in and described above in connection with FIG. 1A). Note that, as described above in connection with FIG. 1A, the page of content to be mirrored can be any suitable content, such as a web page, a user interface of an application executing on computing device 108, a media player window, and/or any other suitable content. As a more particular example, as shown in FIG. 1A, the content can be a page that includes one or more media content items (e.g., video content, audio content, and/or any other suitable type of content) and/or other page content, such as text, links, animations, icons, etc.

At 406, in response to receiving the indication, computing device 208 can initiate a mirroring session by transmitting the page of content to display device 210 to cause the page of content to be mirrored on display device 210. In some implementations, computing device 208 can transmit the page of content using any suitable technique or combination of techniques. For example, in some implementations, computing device 208 can capture the page of content being displayed on computing device 208 (e.g., in a window on computing device 208, a desktop view of computing device 208, and/or any other suitable view) and can encode the page of content in any suitable manner, as described below in connection with block 508 of FIG. 5. As a more particular example, in some implementations, computing device 208 can encode the captured page of content into a video stream, as described in more detail below in connection with block 508 of FIG. 5. Computing device 208 can then transmit the encoded page of content via a local area network which both computing device 208 and display device 210 are connected to. Note that, in instances where the page of content includes audio content (e.g., music, sound effects, and/or any other suitable audio content), computing device 208 can capture the audio content and encode the audio content along with any image and video content to generate the encoded video stream.

It should be noted that, although the implementations described herein generally relate to transferring the playback of content from a computing device to a display device, any suitable media playback device that is connected to the computing device can be used for playing back media content. For example, an audio playback device can be connected to the computing device over a local area network and, in response to determining that the content is to be presented on the audio playback device, the computing device can communicate the media content to the audio playback device. In another example, multiple media playback devices, such as multiple display devices and multiple audio devices, can be connected to the computing device over a local area network and, in response to determining that the playback of the content is to be transferred to a media playback device, the computing device can receive a user selection of which media device to present the content (e.g., the media device in which the mirroring session was initiated) or the computing device can determine which media device has the capabilities suitable for presenting the media content.

At 408, display device 210 can receive the transmitted page of content and can begin presenting the received page of content on display device 210. In some implementations, display device 210 can perform any suitable decoding required to decode the encoded video stream that was transmitted by computing device 208 at block 406. For example, in some implementations, display device 210 can use any suitable codec to decode the video stream. Note that, both computing device 208 and display device 210 can be presenting the page of content simultaneously, thereby causing the content to be mirrored on both devices.

At 410, computing device 208 can receive an indication that a media content item included in the page of content is to be presented on display device 210. For example, in some implementations, a user of computing device 208 can select the media content item to begin presentation, select an input that causes the media content item to be presented in a full-screen window, and/or any other suitable type of indication. As another example, in some implementations, computing device 208 can determine that a user has selected a media content item associated with a particular type of content (e.g., Encrypted Media Extensions, or EME, content, and/or any other suitable type of content). As yet another example, in some implementations, computing device 208 can determine that a video player window in which the media content item is being presented occupies more than a predetermined portion of a screen of computing device 208 (e.g., more than 80%, more than 85%, and/or any other suitable portion). The received indication can, in some implementations, be used as a signal to indicate that the user of computing device 208 desires to view the media content item at the exclusion of other content presented on the page.

Note that, in some implementations, the indication that presentation of the media content item is to be transferred to display device 210 can be based on any other suitable information. For example, in some implementations, the indication can be based on user-configured settings that indicate that media content of a particular type (e.g., from a particular source, videos, audio content, and/or any other suitable type) is to be presented by display device 210. As another example, in some implementations, the indication can be based on implicit feedback. As a more particular example, in some implementations, computing device 208 can determine that a user of computing device 208 has selected media content from a particular source to be presented by display device 210, and can therefore default to presenting the media content item by display device 210 for future presentation of media content from the particular source. Conversely, in some implementations, computing device 208 can determine that a user of computing device 208 has previously preferred to mirror media content of a particular type (e.g., media content from a particular source, videos, audio content, and/or any other suitable type), and computing device 208 can then determine that presentation of media content of the particular type is not to be transferred to display device 210 and is to instead be mirrored from computing device 208.

In some implementations, the received indication can be ignored or otherwise discarded and/or a determination as to whether the received indication corresponds to a desire to consume the media content item at the exclusion of other content may not be performed in response to determining that a mirroring session has not been initiated. For example, computing device 208 can determine that the received indication corresponds to a desire to view the media content item at the exclusion of other content on a page only after a mirroring session has been initiated. In another example, computing device 208 can determine that the received indication corresponds to a desire to view the media content item at the exclusion of other content on a page in response to determining that a mirroring session has been initiated for a given amount of time and in response to receiving a particular indication (e.g., a user selection to view the media content item in a full-screen mode). In yet another example, the received indication can be ignored and, as such, a media remoting session is not initiated in response to determining that the playback of a media content item started prior to a mirroring session being initiated.

In some implementations, computing device 208 can determine whether the received indication corresponds to a desire to view the media content item at the exclusion of other content on a page in response to determining whether a companion application can be executed on the display device to present the media content item, where the companion application is associated with the application presenting the page or the media content item on the computing device. For example, computing device 208 can determine whether a flinging session can be initiated such that a companion application is launched on the display device, which then fetches the media content item, decodes the media content item, and presents the media content item on the display device. This can include, for example, determining whether an application has been installed on computing device 208 and/or the corresponding display device. This can also include, for example, determining whether a companion application corresponding to the media content item is available from one or more sources, such as a content provider source associated with the media content item.

Referring back to FIG. 4, at 412, computing device 208 can automatically initiate a media remoting session by transmitting a video stream corresponding to the selected media content item to display device 210 in response to determining that the received indication corresponds to a desire to view the media content item at the exclusion of other content presented on the page. Note that, in some implementations, computing device 208 can transmit the video stream in a format that was received from server 202, that is, without decoding and/or decrypting the video stream before transmitting the video stream to display device 210. Additionally or alternatively, in some implementations, computing device 208 can transmit an indication of a location of the selected media content item (e.g., as indicated in a "<video>" element tag, as indicated in an "<audio>" element tag, and/or indicated in any other suitable manner), which can allow display device 210 to directly fetch and present the selected media content item. Additionally, note that, in some implementations, computing device 208 can inhibit presentation of the media content item on computing device 208.

In some implementations, the selected media content item can be stored locally on computing device 208. In some such implementations, computing device 208 can transmit the selected media content item from local memory to display device 210 using any suitable technique(s). In instances where the selected media content item is encrypted, computing device 208 can decrypt the selected media content item prior to transmitting the selected media content item to display device 210 and/or display device 210 can obtain the key to allow display device 210 to decrypt the selected media content item. Note that, in some implementations, computing device 208 can transmit the selected media content item as a video stream, and display device 210 can begin presenting the selected media content item as the video stream is received (e.g., prior to receiving the full stream). Furthermore, in some implementations, the locally stored selected media content can include content that is currently being recorded, for example, by a camera or microphone associated with computing device 208. In some such implementations, the captured content can be transmitted to display device 210 as a video stream and/or an audio stream, and can presented by display device 210 during the media remoting session as it is received by display device 210.

In some implementations, computing device 208 can present any suitable alternative content, such as a user interface that indicates that the media content item will be presented and/or is being presented on display device 210, as shown in and described above in connection with FIG. 1C. Additionally or alternatively, in some implementations, computing device 208 can present any suitable video player controls that can allow a user to manipulate playback of the media content item (e.g., pause presentation, fast-forward, rewind, change a volume of associated audio content, mute associated audio content, and/or any other suitable playback manipulation) on display device 210 using the controls presented on computing device 208, as shown in and described above in connection with FIG. 1C. For example, computing device 208 can continue to present a video player window that includes video player controls that are synchronized with the playback on display device 210 while suppressing the playback of the media content item on computing device 208.

At 414, display device 210 can perform any suitable decoding and/or decryption techniques on the received video stream and can begin presenting the media content item. For example, in instances where the video stream is encrypted, display device 210 can decrypt the video stream using any suitable key. In some such implementations, computing device 208 can indicate the key or display device 210 can obtain the key. Additionally or alternatively, in some implementations, computing device 208 can represent display device 210 in communications with a Digital Rights Management (DRM) server to obtain a key to decrypt the media content item.

At 416, computing device 208 can receive an indication that presentation of the media content item is to stop and/or has played back to completion. For example, in some implementations, computing device 208 can determine that presentation of the media content item will finish within a predetermined time range (e.g., within the next five seconds, within the next ten seconds, and/or any other suitable time range) and/or has already played back to completion. As another example, in some implementations, computing device 208 can determine that a user of computing device 208 has stopped presentation of the media content item and/or navigated to a different page (or to other content). As yet another example, in some implementations, computing device 208 can determine that the user has selected a different media content item for presentation.

At 418, computing device 208 can cause display device 210 to resume the mirroring session of the page of content in response to determining that presentation of the media content item is to stop and/or has finished. For example, as described above in connection with blocks 404 and 406, computing device 208 can resume presenting the page of content on computing device 208, encoding the captured page of content, and transmitting the encoded page of content to display device 210 for presentation on display device 210. Note that, in some implementations, computing device 208 and display device 210 can both present the page of content.

At 420, display device 210 can receive the encoded page of content from computing device 208 and can resume presenting the page of content. In some implementations, display device 210 can perform any suitable decoding of the received page of content prior to presenting the page of content.

It should be noted that, although the implementations described herein generally describe a remoting session to be initiated while a mirroring session has been established, this is merely illustrative. In some implementations, the remoting session can be initiated in response to determining that the user desires to view a particular media content item at the exclusion of other content currently being presented. For example, when using a mobile device that is connected to a display device over a local area connection, the mobile device can determine that the user desires to view a particular media content item (e.g., a detection that the user has selected to view the media content item in a full-screen mode) and, in response to the determination, can initiate a remoting session in which a stream including the media content item is transmitted to the display device, where the display device can decode the received stream and present the media content item.

Figure 5:
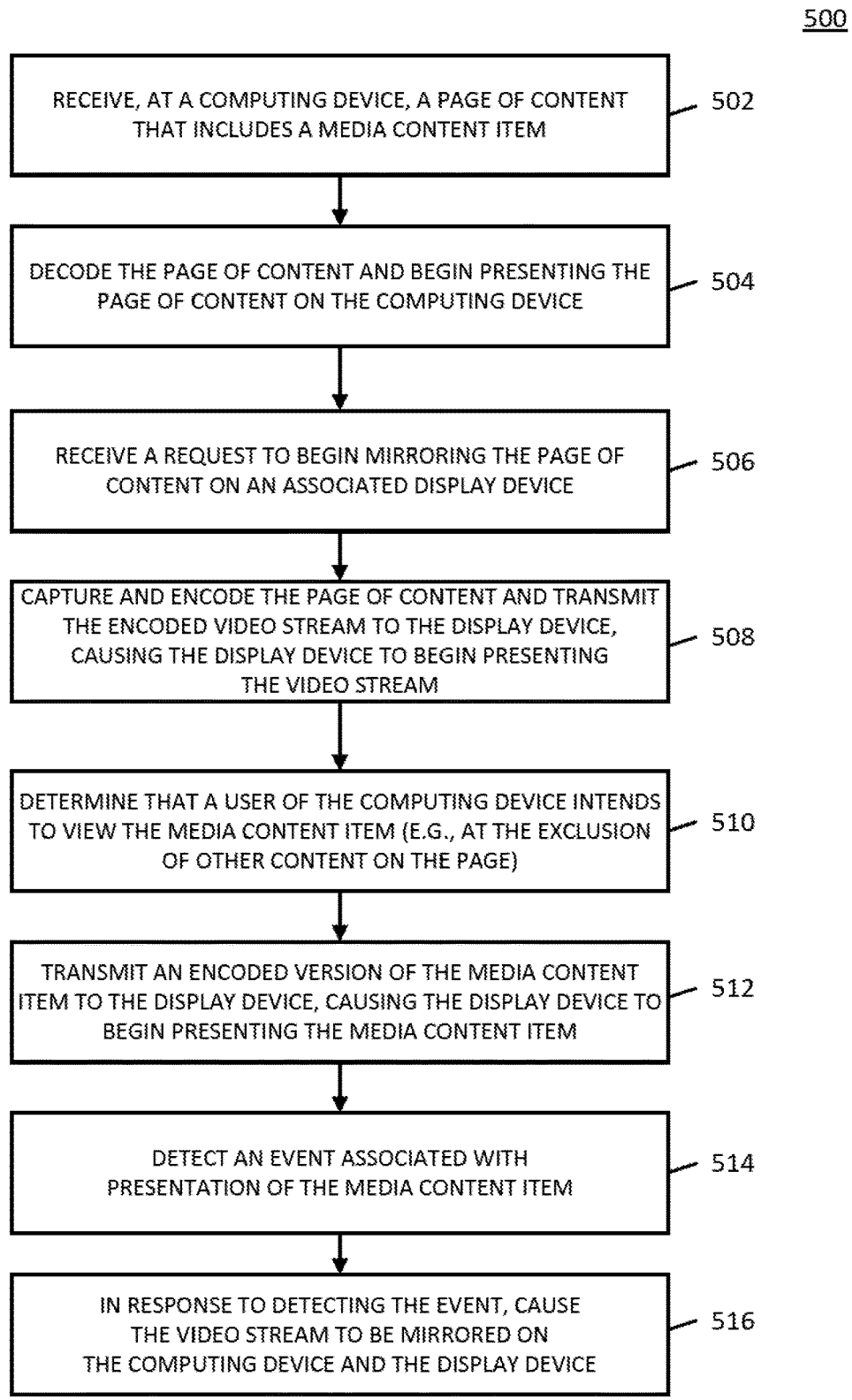
FIG. 5 shows an illustrative example of a process for transferring playback of media content between a mirroring session and a remoting session in accordance with some implementations of the disclosed subject matter.

Turning to FIG. 5, an example 500 of a process for transferring the playback of media content is shown in accordance with some implementations of the disclosed subject matter. In some implementations, blocks of process 500 can be executed on a computing device, such as a tablet computer, a laptop computer, a desktop computer, and/or any other suitable type of computing device as described above in connection with FIG. 2. In some implementations, process 500 can cause presentation of content to be transferred from the computing device to an associated display device, such as a television, a projector, speakers, and/or any other suitable associated display device.

At 502, process 500 can begin by receiving a page of content. For example, in some implementations, process 500 can receive the page of content from a server that hosts the content. In some implementations, the page of content can include any suitable items, such as one or more media content items (e.g., video content items, audio content items, live-streamed video content, and/or another suitable type of media content) and any other suitable content, such as text, images, graphics, etc. In some implementations, the page of content can be in any suitable format, such as a web page, a tabbed window in which a web page is presented, a browser window, a view of a desktop of the computing device, and/or in any other suitable format. In some implementations, the page of content can be received in response to any suitable signal, such as a request from a user of the computing device to load the page of content. Note that, in some implementations, the page of content can be encoded and/or encrypted using any suitable technique(s) or protocol(s).

At 504, process 500 can perform any suitable decoding or decryption on the page of content, and can begin presenting the page of content on the computing device. In some implementations, the page of content can be presented in any suitable manner. For example, in some implementations, the page of content can be presented within a user interface, as shown in and described above in connection with FIG. 1A.

Process 500 can receive a request to initiate a mirroring session on a display device associated with the computing device at 506. For example, as described above, in some implementation, the computing device can cause the page of content to be mirrored on the display device concurrently with presentation of the page of content on the computing device. As described above in connection with block 402 of FIG. 4, the request can be received in any suitable manner, for example, in response to receiving an indication that a user of the computing device has selected an input to initiate the mirroring session on the display device. Note that, in some implementations, the display device can be associated with the computing device in any suitable manner. For example, in some implementations, the display device can be paired with the computing device and can communicate via a local area network to which both the computing device and the display device are connected (e.g., a Wi-Fi network within a user's home or office, a BLUETOOTH network, and/or any other suitable type of local network). Additionally, note that, in some implementations, both the computing device and the display device can be authenticated to a user account associated with a user of the computing device and the display device.

At 508, in response to receiving the request to initiate the mirroring session on the display device, process 500 can capture the page of content presented on the computing device and can re-encode the page of content in any suitable manner. For example, in some implementations, process 500 can capture all image content, video content, and/or audio content being presented on the computing device (e.g., within a particular window selected for mirroring, within a particular tab of a window, within an entire desktop view of the computing device, and/or any other suitable view). In some implementations, process 500 can re-encode the content in any suitable manner. For example, in some implementations, process 500 can encode the content to have any suitable image/video and any suitable audio quality using any suitable compression technique(s). As another example, in some implementations, process 500 can encode the content to have any suitable bitrate. In some implementations, process 500 can continuously encode the content as it is updated on the computing device. In some such implementations, process 500 can encode a portion of content of any suitable buffer duration (e.g., 500 milliseconds, one second, ten seconds, and/or any other suitable duration). Process 500 can then transmit the encoded content as a video stream to the display device. For example, in some implementations, process 500 can transmit the encoded content via a local area network that both the computing device and the display device are connected to, such as a Wi-Fi network, a BLUETOOTH network, and/or any other suitable network.

At 510, in response to receiving a user interaction with a media content item on the page, process 500 can determine that the user interaction indicates that a user of the computing device wants to view a media content item included in the page of content (e.g., at the exclusion of other content on the page). For example, in some implementations, process 500 can determine that the user has selected the media content item to begin being presented on the computing device. As another example, in some implementations, process 500 can determine that the user has maximized a screen size of the media content item (e.g., causing the media content item to be presented in a full-screen window). As yet another example, in some implementations, process 500 can determine that the media content item is being presented in a video player window that occupies more than a predetermined portion of a screen of the computing device (e.g., more than 80%, more than 85%, more than 90%, and/or more than any other suitable portion). As still another example, in some implementations, process 500 can determine that the user has selected a media content item of a particular type (e.g., EME content, and/or any other suitable type of content). Note that, in some implementations, the selected media content item can be a media content item stored on a server, such as server 202.

At 512, process 500 can initiate a media remoting session by transferring playback of the selected media content item to the associated display device. In some implementations, process 500 can begin transferring playback using any suitable technique or combination of techniques. For example, in some implementations, process 500 can inhibit presentation of the selected media content item on the computing device. As another example, in some implementations, rather than decoding and decrypting the media content item, then capturing the presented media content, encoding the captured version of the media content item and transferring the encoded captured version of the media content item to the display device, process 500 can instead cause the media content item as it is received from the server to be transmitted to the display device. In some implementations, the display device can obtain a key or an indication of key that can be used by the display device to decrypt the selected media content item. As described above in connection with FIG. 4, the display device can then begin presenting the media content item, for example, in a full-screen mode as shown in FIG. 1B. Additionally, in some implementations, process 500 can cause the computing device to present an indication that the selected media content item has been re-routed to the display device. Additionally or alternatively, in some implementations, process 500 can cause a user interface with any suitable video player controls to be presented on the computing device, as shown in and described above in connection with FIG. 1C.

Note that, in some implementations, the selected media content item can be a media content item stored on a server, such as server 202. Additionally or alternatively, in some implementations, the selected media content item can be stored locally on the computing device. In instances where the selected media content item is stored locally on the computing device, process 500 can transfer playback of the selected media content item in any suitable manner. For example, as described above in connection with block 412 of FIG. 4, process 500 can transmit the selected media content item from local memory of the computing device to the display device for presentation. Furthermore, in instances where the locally stored selected media content item is encrypted, process 500 can decrypt the selected media content item prior to transmission to the display device or the display device can obtain a key or an indication of a key so that the display device can decrypt the selected media content item. In some implementations, locally stored media content items can include any suitable type of media content, such as image files, audio content files, video content files, audio or video content that is currently being captured, and/or any other suitable type of media content, as described above in more detail in connection with blocks 402 and 412 of FIG. 4.

Note that, in some implementations, process 500 can first determine if the display device is capable of presenting the selected media content item based on any suitable information. For example, in some implementations, process 500 can determine if the display device is capable of decoding or decrypting the selected media content item based on a protocol used to encode the selected media content item and device capabilities associated with the display device. In some implementations, if process 500 determined that the display device is not capable of decoding and/or decrypting the selected media content item, process 500 can determine that the computing device is to present the selected media content item and continue mirroring the content (including presentation of the selected media content item) with the display device, rather than transferring playback to the display device.

It should also be noted that, in some implementations, prior to initiating a media remoting session by transferring playback of the selected media content item to the associated display device, process 500 can first determine whether the computing device has initiated a mirroring session with the page that includes the media content item. For example, process 500 can determine that the received user interaction corresponds to a desire to view the media content item at the exclusion of other content on a page only after a mirroring session has been initiated. In another example, process 500 can determine that the received user interaction corresponds to a desire to view the media content item at the exclusion of other content on a page in response to determining that a mirroring session has been initiated for a given amount of time and in response to receiving a particular user interaction (e.g., a user selection to view the media content item in a full-screen mode). In yet another example, process 500 can ignore the received user interaction in response to determining that the playback of a media content item started prior to a mirroring session being initiated.

In some implementations, process 500 can determine whether the received user interaction corresponds to a desire to view the media content item at the exclusion of other content on a page in response to determining that a companion application is not available for execution on the display device to present the media content item. For example, prior to initiating a media remoting session by transferring playback of the selected media content item to the associated display device, process 500 can determine whether a flinging session can be initiated such that a companion application is launched on the display device, which then fetches the media content item, decodes the media content item, and presents the media content item on the display device. This can include, for example, determining whether an application has been installed on the computing device and/or the corresponding display device. This can also include, for example, determining whether a companion application corresponding to the media content item is available from one or more sources, such as a content provider source associated with the media content item. In response to determining that a companion application can be launched on the display device, the received user interaction can be ignored and the remoting session may not be initiated.

Additionally, note that, in some implementations, during presentation of the selected media content item by the display device, process 500 can periodically (e.g., every ten seconds, every minute, and/or at any other suitable frequency) transmit a request to the display device to indicate a time stamp corresponding to a current playback position of the selected media content item. In some such implementations, process 500 can synchronize playback controls presented on a user interface on the computing device (e.g., as shown in and described above in connection with FIG. 1C) with presentation of the selected media content item on the display device based on the received time stamps.

At 514, process 500 can detect an event associated with presentation of the media content item. For example, in some implementations, process 500 can determine that presentation of the media content item has played back to completion. As another example, in some implementations, process 500 can determine that a user of the computing device has selected an input to terminate presentation of the selected media content item or to begin presenting a different media content item. As yet another example, in some implementations, process 500 can determine that a user of the computing device has minimized a video player window in which the media content item is being presented or indicated that the media content item is to be presented in a smaller window (e.g., rather than a full-screen window).

In some implementations, the detected event can relate to a quality of the presentation of the selected media content item on the display device. For example, in some implementations, in instances where a user has selected that captions be presented in connection with presentation of the selected media content item, process 500 can determine if captions are being presented on the display device, and if captions are not being correctly presented, can determine that mirroring of the content should resume. As another example, in some implementations, process 500 can determine whether the display device is able to buffer a suitable duration of the selected media content item (e.g., at least twenty seconds of content, at least thirty seconds of content, and/or any other suitable duration). If it is determined that the display device is not able to buffer a predetermined duration of content, process 500 can determine that mirroring of the content is to resume.

At 516, process 500 can resume mirroring the page of content in response to detecting the event. For example, in some implementations, process 500 can resume presentation of the page of content on the computing device. As another example, in some implementations, process 500 can resume capturing the presented content, encoding the captured presented content, and transmitting the encoded captured content to the display device for presentation on the display device.

In some implementations, at least some of the above described blocks of the processes of FIGS. 4 and 5 can be executed or performed in any order or sequence not limited to the order and sequence shown in and described in connection with the figure. Also, some of the above blocks of FIGS. 4 and 5 can be executed or performed substantially simultaneously where appropriate or in parallel to reduce latency and processing times. Additionally or alternatively, some of the above described blocks of the processes of FIGS. 4 and 5 can be omitted.

In some implementations, any suitable computer readable media can be used for storing instructions for performing the functions and/or processes herein. For example, in some implementations, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personal information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for transferring playback of media content are provided.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for transferring playback of media content, the method comprising:
   receiving a request to initiate a mirroring session in which a tabbed window including a page having a plurality of media content items is rendered on a computing device and transmitted as a video stream to a display device that is in communication with the computing device over a local area network;
   encoding the video stream including the tabbed window and the plurality of media content items;
   transmitting the encoded video stream to the display device via the local area network;
   determining that a user of the tabbed window on the display device intends to view a media content item from the plurality of media content items on the page;
   inhibiting presentation of the media content item on the computing device;
   causing the media content item to be decoded and presented on the display device;
   detecting an event associated with presentation of the media content item on the display device; and
   in response to detecting the event associated with presentation of the media content item on the display device, causing the mirroring session to resume.

2. The method of claim 1, wherein the media content item is received from a server.

3. The method of claim 1, further comprising:
   determining whether the display device is capable of decoding the media content item; and
   in response to determining that the display device is not capable of decoding the media content item, causing the mirroring session to resume.

4. The method of claim 1, further comprising:
   determining whether a signal that the user has maximized a video player window in which the media content item is to be presented has been received; and
   in response to determining that the signal has been received, causing a media remoting session to be initiated as the user of the tabbed window intends to view the media content item.

5. The method of claim 1, further comprising:
   determining whether a signal that a video player window in which the media content item is to be presented occupies a given portion of the tabbed window has been received; and
   in response to determining that the signal has been received, causing a media remoting session to be initiated as the user of the tabbed window intends to view the media content item.

6. The method of claim 1, wherein the event associated with presentation of the media content item is detected in response to determining that the user has navigated to a different tabbed window.

7. The method of claim 1, further comprising causing the media content item to be decrypted by the display device prior to presentation of the media content item on the display device.

8. A system for transferring playback of media content, the system comprising:
a memory; and
a hardware processor that, when executing computer executable instructions stored in the memory, is configured to:
receive a request to initiate a mirroring session in which a tabbed window including a page having a plurality of media content items is rendered on a computing device and transmitted as a video stream to a display device that is in communication with the computing device over a local area network;
encode the video stream including the tabbed window and the plurality of media content items;
transmit the encoded video stream to the display device via the local area network;
determine that a user of the tabbed window on the display device intends to view a media content item from the plurality of media content items on the page;
inhibit presentation of the media content item on the computing device;
cause the media content item to be decoded and presented on the display device;
detect an event associated with presentation of the media content item on the display device; and
in response to detecting the event associated with presentation of the media content item on the display device, cause the mirroring session to resume.

9. The system of claim 8, wherein the media content item is received from a server.

10. The system of claim 8, wherein the hardware processor is further configured to:
determine whether the display device is capable of decoding the media content item; and
in response to determining that the display device is not capable of decoding the media content item, cause the mirroring session to resume.

11. The system of claim 8, wherein the hardware processor is further configured to:
determine whether a signal that the user has maximized a video player window in which the media content item is to be presented has been received; and
in response to determining that the signal has been received, cause a media remoting session to be initiated as the user of the tabbed window intends to view the media content item.

12. The system of claim 8, wherein the hardware processor is further configured to:
determine whether a signal that a video player window in which the media content item is to be presented occupies a given portion of the tabbed window has been received; and
in response to determining that the signal has been received, cause a media remoting session to be initiated as the user of the tabbed window intends to view the media content item.

13. The system of claim 8, wherein the event associated with presentation of the media content item is detected in response to determining that the user has navigated to a different tabbed window.

14. The system of claim 8, wherein the hardware processor is further configured to cause the media content item to be decrypted by the display device prior to presentation of the media content item on the display device.

15. A non-transitory computer-readable medium containing computer-executable instructions that, when executed by a processor, cause the processor to perform a method for transferring playback of media content, the method comprising:
receiving a request to initiate a mirroring session in which a tabbed window including a page having a plurality of media content items is rendered on a computing device and transmitted as a video stream to a display device that is in communication with the computing device over a local area network;
encoding the video stream including the tabbed window and the plurality of media content items;
transmitting the encoded video stream to the display device via the local area network;
determining that a user of the tabbed window on the display device intends to view a media content item from the plurality of media content items on the page;
inhibiting presentation of the media content item on the computing device;
causing the media content item to be decoded and presented on the display device;
detecting an event associated with presentation of the media content item on the display device; and
in response to detecting the event associated with presentation of the media content item on the display device, causing the mirroring session to resume.

16. The non-transitory computer-readable medium of claim 15, wherein the media content item is received from a server.

17. The non-transitory computer-readable medium of claim 15, wherein the method further comprises:
determining whether the display device is capable of decoding the media content item; and
in response to determining that the display device is not capable of decoding the media content item, causing the mirroring session to resume.

18. The non-transitory computer-readable medium of claim 15, wherein the method further comprises:
determining whether a signal that the user has maximized a video player window in which the media content item is to be presented has been received; and
in response to determining that the signal has been received, causing a media remoting session to be initiated as the user of the tabbed window intends to view the media content item.

19. The non-transitory computer-readable medium of claim 15, wherein the method further comprises:
determining whether a signal that a video player window in which the media content item is to be presented occupies a given portion of the tabbed window has been received; and
in response to determining that the signal has been received, causing a media remoting session to be initiated as the user of the tabbed window intends to view the media content item.

20. The non-transitory computer-readable medium of claim 15, wherein the event associated with presentation of the media content item is detected in response to determining that the user has navigated to a different tabbed window.

21. The non-transitory computer-readable medium of claim 15, wherein the method further comprises causing the media content item to be decrypted by the display device prior to presentation of the media content item on the display device.

* * * * *